(12) United States Patent
Mohamadi et al.

(10) Patent No.: US 8,077,072 B2
(45) Date of Patent: Dec. 13, 2011

(54) STATIC RF IMAGING FOR INSIDE WALLS OF A PREMISES

(75) Inventors: Farrokh Mohamadi, Irvine, CA (US); Soumya K. Nag, San Marcos, CA (US)

(73) Assignee: Tialinx, Inc., Newport Beach, CA (US)

( * ) Notice: Subject to any disclaimer, the term of this patent is extended or adjusted under 35 U.S.C. 154(b) by 32 days.

(21) Appl. No.: 12/649,268

(22) Filed: Dec. 29, 2009

(65) Prior Publication Data

US 2011/0050479 A1 Mar. 3, 2011

Related U.S. Application Data

(60) Provisional application No. 61/239,752, filed on Sep. 3, 2009.

(51) Int. Cl.
*G01S 13/00* (2006.01)
(52) U.S. Cl. ............................ 342/22; 342/176; 342/191
(58) Field of Classification Search .................... 342/22, 342/176, 191
See application file for complete search history.

(56) References Cited

U.S. PATENT DOCUMENTS

| | | | | |
|---|---|---|---|---|
| 5,955,989 A | * | 9/1999 | Li | 342/368 |
| 7,764,220 B1 | * | 7/2010 | Samaniego | 342/25 A |
| 2006/0085133 A1 | * | 4/2006 | Young et al. | 702/5 |
| 2009/0262006 A1 | * | 10/2009 | McNeill et al. | 342/22 |

\* cited by examiner

*Primary Examiner* — Timothy A Brainard
(74) *Attorney, Agent, or Firm* — Haynes and Boone, LLP (57) ABSTRACT

A system includes a radar unit configured to provide raw data from scanning an exterior of a structure; and a signal processing and imaging module configured to: process the raw data into markers of interior locations of the structure; and display an image of interior structural features based on the markers. A method includes: scanning a building structure from the exterior of the structure using a radar unit to provide raw data; processing the raw data into markers of interior locations of the structure; estimating locations of interior structural features of the structure from the markers; and displaying an image of the interior structural features.

8 Claims, 10 Drawing Sheets

STATIC RF IMAGING FOR INSIDE WALLS OF A PREMISES

CROSS REFERENCE TO RELATED APPLICATIONS

This application claims the benefit of U.S. Provisional Application No. 61/239,752, filed Sep. 3, 2009, which is hereby incorporated by reference.

BACKGROUND

The present disclosure generally relates to radio frequency (RF) detection and ranging and, more particularly, to detecting and imaging inside walls of a building structure from outside the building.

Portable, hand-held radars have been used for detection of hidden objects, e.g., objects such as weapons hidden behind a wall of a building. In some situations, e.g., constitutionally supported government agency investigation of a premises containing buildings of unknown internal configuration, military intelligence scenarios, or fire and rescue situations, it may be desirable to be able to detect interior structural arrangement of a building from outside the building using the same sort of portable, hand-held radars.

SUMMARY

According to one embodiment, a system includes a radar unit configured to provide raw data from scanning an exterior of a structure; and a signal processing and imaging module configured to: process the raw data into markers of interior locations of the structure; and display an image of interior structural features based on the markers.

According to another embodiment, a method includes: scanning a building structure from the exterior of the structure using a radar unit to provide raw data; processing the raw data into markers of interior locations of the structure; estimating locations of interior structural features of the structure from the markers; and displaying an image of the interior structural features.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. Like reference numerals are used to identify like elements illustrated in one or more of the figures.

DETAILED DESCRIPTION

In accordance with one or more embodiments of the present invention, systems and methods disclosed herein provide mapping of static objects such as building walls within a building on a premises from multiple, sparse, and stationary positions outside the building using a radar, such as a hand-held portable radar system. Such portable radar systems have been used for dynamically scanning for objects (e.g., ordnance or vehicles) behind a wall, both from moving vehicles, on-road and off-road, and from the ground, but have not been used to statically locate internal structural details of, for example, buildings or other structures located on a premise. In one or more embodiments, only one radar unit is needed for estimating the location of inside walls of such a structure. Such a system is useful, for example, to persons (e.g., fire, rescue workers, military, and police) having a legitimate need for information regarding the interior of a building structure when, for example, entering the building is not practical or safe and other, alternative information regarding the building interior is unavailable or unreliable.

Figure 1:
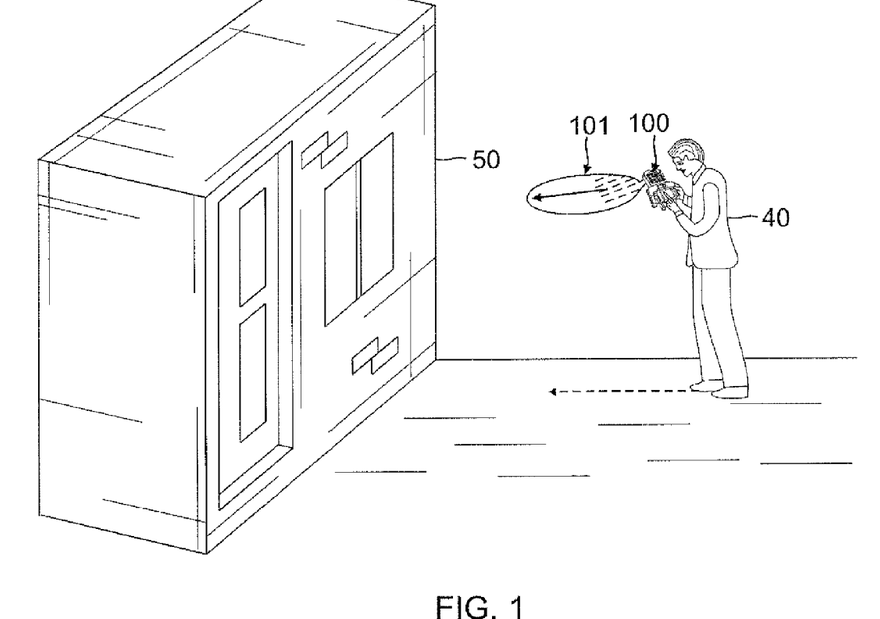
FIG. 1 is a perspective diagram illustrating an RF imaging system, at a stand-off distance, in accordance with one embodiment.
Figure 2:
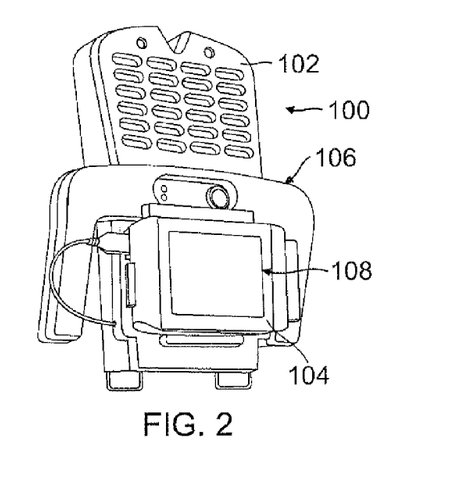
FIG. 2 is a perspective diagram illustrating in more detail the system of FIG. 1 in accordance with one embodiment.

FIG. 1 illustrates an RF imaging system 100 according to one or more embodiments. System 100 may emit RF radiation 101 toward a building structure 50 in a direction controlled by a user or operator 52, for example, by aiming a hand-held unit containing the radar system 100 as shown in FIG. 1. The transmitter of the system 100 may, for example, emit rapid wideband radar pulses at a chosen pulse repetition frequency (PRF). The micro-wave or millimeter-wave pulses can penetrate glass, wood, soil, concrete, dry wall and bricks with varying attenuation constant. By choosing a PRF in the range of 1-10 MHz and appropriate average transmitter power, a surveillance range of approximately 40-400 feet (ft) can be generally achievable. The radar of system 100 may, for example, transmit 200 pico-second wide Gaussian pulses with 5 GHz or 60 GHz center frequency. An array of dipole, patch or spiral antennas may be employed to enhance antenna directionality and enable beam forming FIG. 2 illustrates system 100 in more detail. System 100 may include a radar unit 102 that may provide raw data, from scanning building 50, to a signal processing and imaging module 104 that may include, for example, a computer processor (not shown) and an image display 108. System 100 may also provide handles and controls 106 adapted for interfacing system 100 to user 52. In the receiver of radar unit 102, for example, a correlator pulse detector circuit may be employed to identify reflections of the radiation 101. Amplitude and delay information may be extracted and processed in an integrated signal processor, for example, included in signal processing and imaging module 104. Image construction algorithms may be implemented using digital signal processing (DSP) and may yield a 2-dimensional or 3-dimensional image on image display 108 showing interior structural features—such as walls—of building structure 50.

Figure 3:
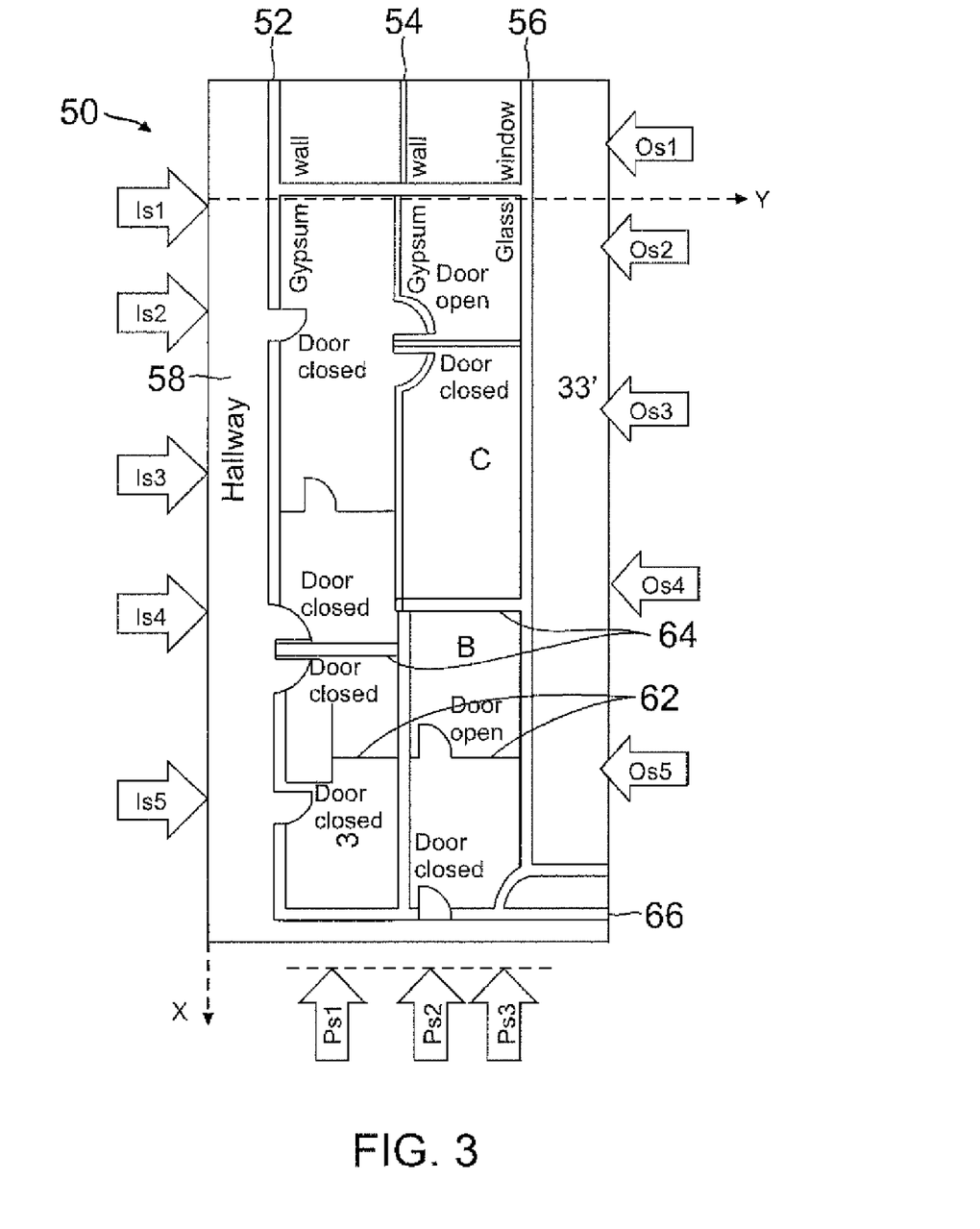
FIG. 3 is a building floor plan illustrating data collection locations for detection of inside walls in accordance with an embodiment.

FIG. 3 is a building floor plan, e.g., of building 50, showing data collection locations for detection of inside walls, for example, of building 50. FIG. 3 shows a scenario for data collection at multiple positions around a typical office space, e.g., building 50. Note that the floor-plan may not be drawn to scale, and is for illustration purposes only. An image grid having an origin O, a Y-axis running across the page, and an X-axis running down the page are indicated in FIG. 3. The walls 52, 54, running parallel and walls 62, 64, 66 running perpendicular to the long hallway 58 are made of gypsum, whereas the walls 56 on the opposite side are made of glass (typical glass windows). Building 50, which may be an office space, for example, may have doors that are made of wood, some of which are open as raw data is collected, as indicated in FIG. 3.

At least three sparse locations are necessary on each side of the building 50 for wall mapping. The arrows labeled Is1, Is2, Is3, Is4 and Is5, with arrow-head pointing in the direction of radar range, indicate five radar scan locations, e.g., from the exterior of building 50. The separation between Is1-Is2, Is2-Is3, Is3-Is4, Is4-Is5 for this example are respectively 5 ft, 17 ft, 29 ft and 43 ft. The scan locations on the opposite side of the building are indicated by arrows labeled Os1, Os2, Os3, Os4 and Os5, with arrow-head pointing in the direction of radar range. The separation between Os1-Os2, Os2-Os3, Os3-Os4, Os4-Os5 are also for this example respectively 5 ft, 17 ft, 29 ft and 43 ft. There is, however, a 5 ft offset between the Is1-Is5 and the Os1-Os5 sets. The scan locations perpendicular to the hallway 58 (e.g. scan locations are spaced apart in the Y direction) are indicated by arrows labeled Ps1, Ps2, and Ps3, with arrow-head pointing in the direction of radar range, and for this example with 5 ft separation each between Ps1-Ps2 and Ps2-Ps3. All the scan locations for this example are at 5 ft stand-off distance from the walls to the portable radar system 100 which is hand held at 5 ft above the ground. Raw data over a range of 1 through 33 ft with 12.7152 picosecond time step and 10 MHz pulse repetition frequency (PRF) may be collected by system 100 using radar scanning software known in the art. The system 100 (e.g., radar unit 102) may be tilted back and forth by an angle up to about 15 degrees in order to ensure that stronger return signals are captured over the tilt angle range, as opposed to keeping the radar unit 102 completely static. At each scan location (e.g., Is1, Is2, Is3, Is4, Is5, Os1, Os2, Os3, Os4, Os5, Ps1, Ps2, and Ps3) multiple waveforms are recorded using an envelope detector filter in the system 100 scanning software. Multiple waveforms (e.g., 30 for the present example) collected at a given scan location can be used to perform an integration of multiple waveforms to give an improved signal-to-noise-ratio (SNR).

The motivation behind capturing data at opposite sides of the office space of building 50 (e.g., Os1-Os5 on the opposing side of building 50 from Is1-Is5) is to spatially correlate the multiple echoes from the walls and other objects taken from one side (e.g., Os1-Os5) with that observed in the waveforms collected from the other side (e.g., Is1-Is5). The echoes observed later in time (or farther in range) in the Is1-Is5 locations are expected to be spatially correlated with the echoes, stronger and closer in range, in the waveforms measured at locations (Os1-Os5) as long as:

(a) the separation between the Is1-Is5 scan set and Os1-Os5 scan set is less than the maximum unambiguous radar range (30 ft for the present example);

(b) the scan locations Os1-Os5 lie inside the system 100 antenna −10 dB beam width overlap with the corresponding locations in the Is1-Is5 scan set or vice versa; and (c) the waveforms at Os1-Os5 scan locations are time aligned with that from the Is1-Is5 scan locations with the a priori knowledge of the physical separation between the two scan location sets (e.g., at least the width of the building 50). In an actual operational scenario this information on the separation between the two opposite scan locations can be readily obtained. This dual information at opposite sides of the building 50 can give a higher probability of detection and hence a more reliable mapping of walls and other static, reflective objects inside the space, especially when the SNR can be lower for the data measured from one side. For situations when information is limited to that from only one side of the building 50, the information can still be used for mapping. Data measured at locations Ps1, Ps2, and Ps3 perpendicular to the hallway 58 can provide information of perpendicular walls (e.g., walls 62, 64, 66) and other static objects inside the building 50 that cannot be detected in the data at Is1-Is5 and Os1-Os5 locations.

Figure 4:
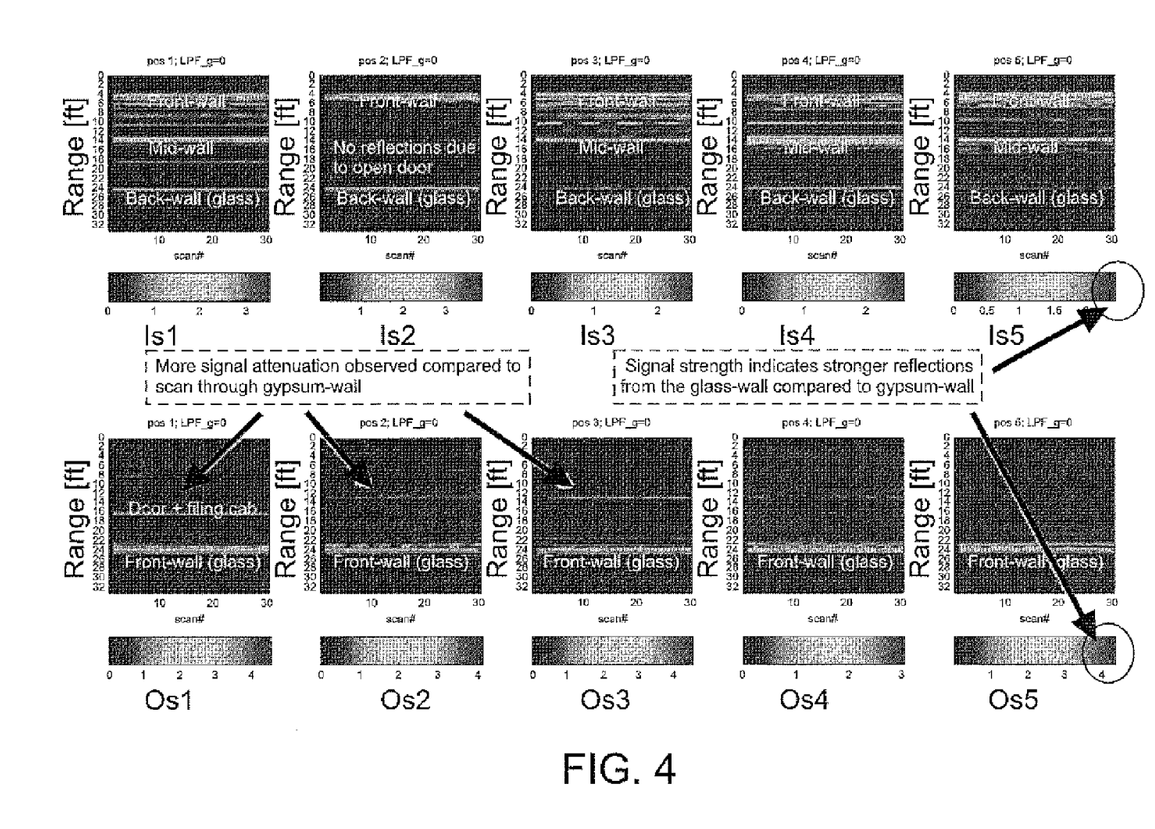
FIG. 4 is a set of signal strength graphs corresponding to a subset of data collection locations of FIG. 3 in accordance with an embodiment.

FIG. 4 is a set of signal strength graphs corresponding to a subset of data collection locations of FIG. 3. Each graph of FIG. 4 shows the envelope of the reflected signal strength as functions of range vs. waveform number (e.g., "scan #", 30 scans) for scan positions at Is1-Is5 and at Os1-Os5. The time-domain responses for the Is1-Is5 scan locations indicate the locations of the walls inside the office space, apart from the outer walls 52, 56 (closest and farthest from the radar locations). The Os1-Os5 plots have been time-reversed to coincide with the same vertical axis of the Is1-Is5 plots. Also, these waveforms have been time adjusted with respect to the Is1-Is5 waveforms with the knowledge of width of the building 50 (e.g., 21 ft). Thus, the two data sets have one common vertical range axis.

The maximum limits of the color bars in the Os1-Os5 plots are higher than that of the Is1-Is5 plots and hence indicate higher reflection coefficient of signals from the glass-wall 56. Also signals at longer ranges, reflected from structures (e.g., walls 54, 62, 64) inside the office space 50, for the Os1-0s5 scan locations indicate lower SNR compared to that through the gypsum-walls 52. This is due to the fact that two-way attenuation constant of plane-waves through glass is 4.0 dB/cm at 5.0 GHz, compared to two-way attenuation of 0.4 dB/cm through gypsum-wall. It is interesting to note that in the "Os1" data, there was an open door positioned at the radar unit 102 boresight and a metallic filing cabinet to the left-side of the radar unit 102 that created stronger echoes at the 16 ft range, and obscured the echo from the mid-wall at 14 ft.

Figure 5:
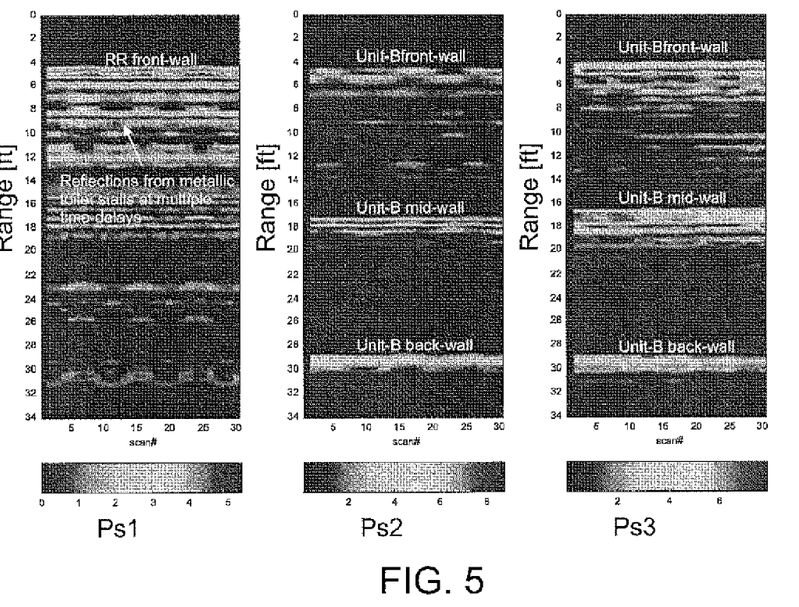
FIG. 5 is a set of signal strength graphs corresponding to another subset of data collection locations of FIG. 3 in accordance with an embodiment.

FIG. 5 is a set of signal strength graphs corresponding to the subset Ps1, Ps2, and Ps3 (perpendicular to the hallway 58) of data collection locations of FIG. 3. Each graph of FIG. 5 shows the envelope of the reflected signals as functions of range vs. waveform number (e.g., "scan #", 30 scans) for scan positions at locations Ps1, Ps2 and Ps3, perpendicular to the hallway 58. An $R^{0.5}$ range function has been multiplied with the data to compensate for the path loss. The waveforms indicate reflections from metallic toilet aisles at several time delays across the 7-18 ft range. However, waveforms at locations Ps2 (facing a closed door) and Ps3 (facing a gypsum-wall) indicate the presence of mid-wall and back-wall of office space B (see, e.g., FIG. 3). The mid-walls inside the office space C could not be detected because their locations were greater than the unambiguous radar range of 30 ft for system 100. These walls would have been detected if data were available from the office space to the left of C (along negative X-axis in FIG. 3), because they would be less than the 30 ft from the radar unit 102 unambiguous range if scanned from such a location.

Figure 6:
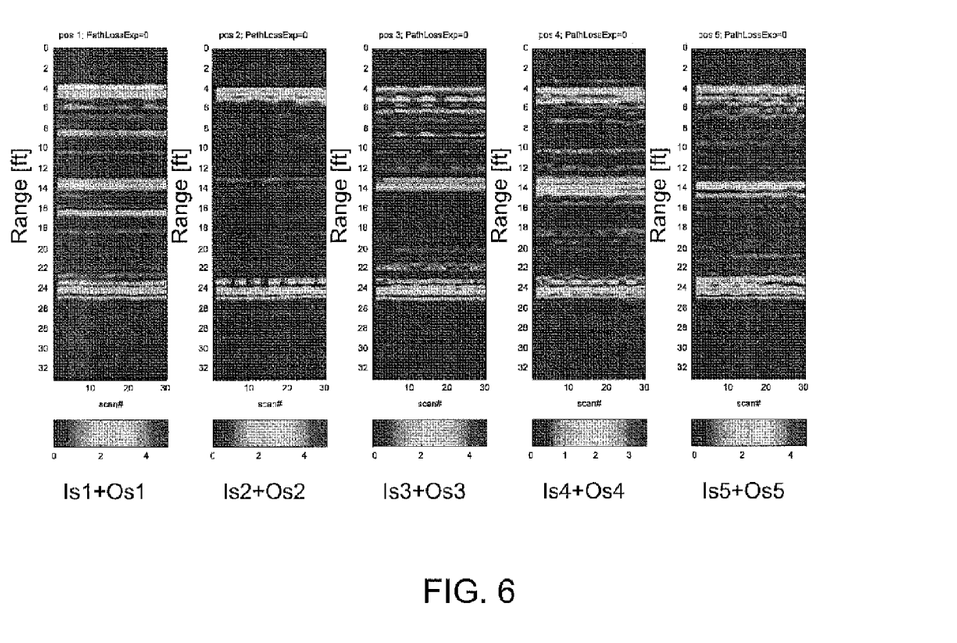
FIG. 6 is a set of signal strength graphs for which an addition has been performed in accordance with an embodiment.

FIG. 6 is a set of signal strength graphs for which an addition has been performed. A key idea behind generating images of walls inside the building 50 involves a combining of spatially coherent reflected signals at multiple range-bins exceeding an appropriate amplitude threshold, that are observed from multiple, sparse scan locations such as Is1-Is5, Os1-Os5, and Ps1-Ps5. More scan locations at a given side of the building 50 will generally yield more reliable estimation of the wall locations perpendicular to the radar down-range, as long as the interior walls are not shadowed by other strong scattering objects (e.g. furniture, or cabinets, for example).

If data are available from the two opposite sides of the building 50 (e.g., Os locations and Is locations), then the data can be summed to enhance the wall detection, after appropriate time alignment of the two data sets. The results after summing Is1-Is5 and Os1-Os5 datasets respectively are shown in each graph of FIG. 6. Besides the exterior walls of the building 50 (gypsum walls 52 and glass walls 56), the interior walls 54 are identified. In the "Is1+Os1" waveforms apart from the mid-wall reflections, additional responses at 17 ft. are evident due to the signals reflected by a partially-open wooden door and a filing cabinet detected by system 100 at "Os1" location. In the final reconstructed image, this isolated reflection can be attributed by a separate icon in the image indicating an additional scattering object other than the wall, or it can be neglected since its coordinate would not spatially correlate with responses from other scan locations.

Also, in "Is2+Os2" waveforms the mid-wall 54 inside the; building 50 office space is weak. This is due to the fact that a wooden door in between the "Is2" and "Os2" locations was kept open and hence a strong reflected signal at approximately 14 ft was absent.

Figure 7:
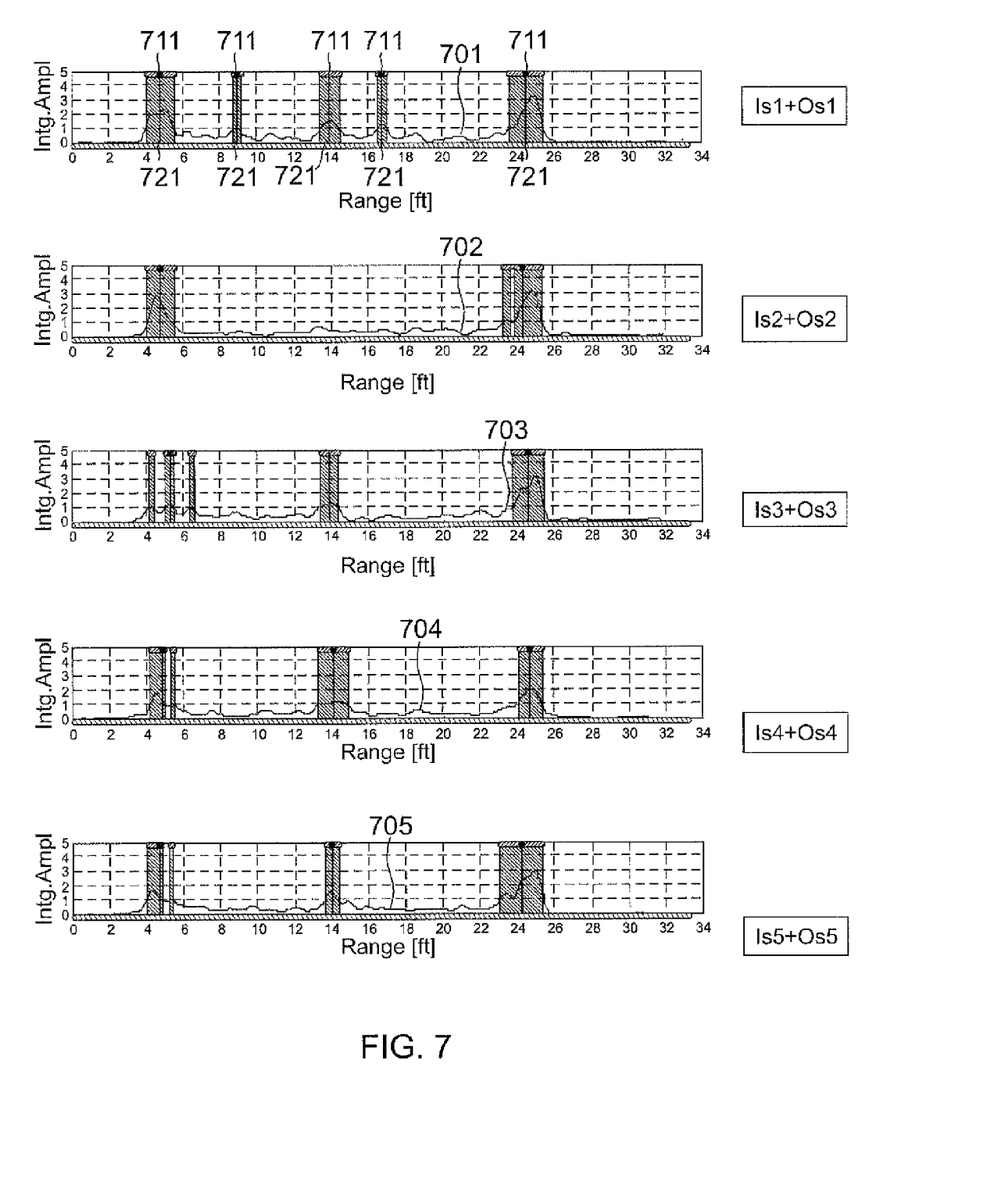
FIG. 7 is a set of signal strength graphs after integration corresponding to responses shown in FIG. 6 in accordance with an embodiment.

FIG. 7 is a set of signal strength graphs after integration corresponding to responses shown in FIG. 6. Further enhancement of the SNR of the waveforms can be achieved at each scan location by summing the successive waveforms. The resultant waveforms, after summing the multiple (e.g., 30 for the present example) waveforms shown in FIG. 6 at each scan location, followed by a N-tap moving average filter, are shown in FIG. 7 (plots 701, 702, 703, 704, 705). The moving average filter may be used to further smooth the noise in the summed waveforms. In this particular example, N has been chosen to be 100. This single, integrated waveform (e.g., each of 701-705) at each scan location can then be used to detect the locations of the walls, based on a suitable threshold ($T_0$). The range-bin whose corresponding amplitude exceeds $T_0$ is considered for a possible wall location. In the present example, a fixed threshold value of 1.0 is used, and the results of the detector output are shown (e.g., shaded areas 711) for each scan location in FIG. 7. As seen in FIG. 7, clusters of shaded markers (e.g., shaded areas 711) are observed. As a next step, each cluster 711 is assigned a single marker 721 at the center of each cluster 711, based on the criterion that clusters 711 of markers are separated from each other by at least a distance parameter $R_{cluster,min}$. For the present example, $R_{cluster,min}$ is chosen to be 1 ft, comparable to the range resolution of system 100 (approximately 1 ft). The mean of each cluster 711 is indicated by a center marker 721 on each integrated waveform, the integrated waveforms being denoted by "Is1+Os1", "Is2+Os2", and so on. This center marker 721 may correspond to an estimated wall location. It should be noted that in the present example a fixed threshold ($T_0$) has been used to estimate the wall coordinates. An adaptive threshold detector, based on cell-averaging constant false alarm rate (CFAR detector), can be used as well to estimate the wall locations based on a given false rate. A higher CFAR threshold implies missed detection of wall locations, whereas a lower CFAR threshold implies an increased probability of false estimation of wall locations, especially when multiple time-delayed reflections from static objects (clutter) inside the rooms are present.

Figure 8A:
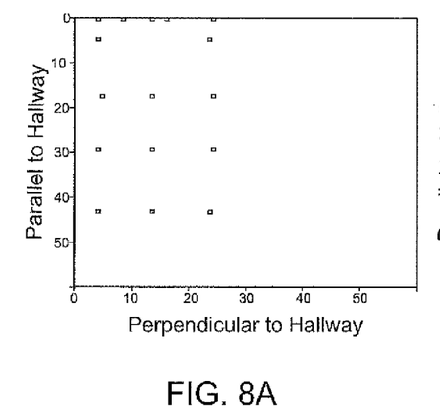
FIG. 8 is a pair of displays showing estimated and interpolated wall coordinates obtained from marker locations shown in FIG. 7 in accordance with one embodiment.

FIG. 8 is a pair of displays showing estimated and interpolated wall coordinates obtained from marker locations shown in FIG. 7. Once the markers 721 corresponding to estimated wall locations are generated, a 2-dimensional "binary" image is formed with coordinates on the image grid (e.g., origin O, X-axis, Y-axis shown in FIG. 3) having coordinates of these markers 721. Such an image is shown in FIG. 8A. FIG. 8A shows white pixels (value=1) corresponding to marker 721 coordinates and black pixels (value=0) corresponding to absence of any wall or other static object. The X-Y coordinate frame used for this imaging is shown in FIG. 3, with the scan location "Is1" as the origin O. Dimensions of each pixel in X and Y axes are chosen, for this example, to be 0.63 ft., i.e. 100 times the range-bin size of 0.0063 ft in the raw waveforms. Also, the size of the image grid along each axis is chosen to be at least greater than the maximum extent of the scans along that axis plus the stand-off distance of the radar unit 102 from the wall being scanned of building 50. In the present example, the image grid is chosen to be square with each side equal to 60 ft.

With the image grid populated with the wall-coordinate pixels (e.g., white pixels shown in FIG. 8A) estimated from multiple scan locations parallel to the long hallway, the walls parallel to the hallway (e.g., walls 52, 54, 56) may be demarcated by straight lines 82, 84, 86 using a suitable criterion. This criterion is such that if the number of "white" pixels along "parallel to hallway" axis (X-axis) at a fixed pixel location on the "perpendicular to hallway" axis (Y-axis) exceeds some specified number ($N_p$), then a straight line indicating the wall location is drawn at the specific "perpendicular to hallway" (Y-axis) pixel for which the line passes through these pixels (e.g., the multiple "white" pixels along "parallel to hallway" axis). Three straight lines 82, 84, 86 are obtained with $N_p=3$. The walls corresponding to lines 82, 84, 86 are the front gypsum-walls 52, middle gypsum-walls 54, and the glass-walls 56 seen in FIG. 3.

Figure 9:
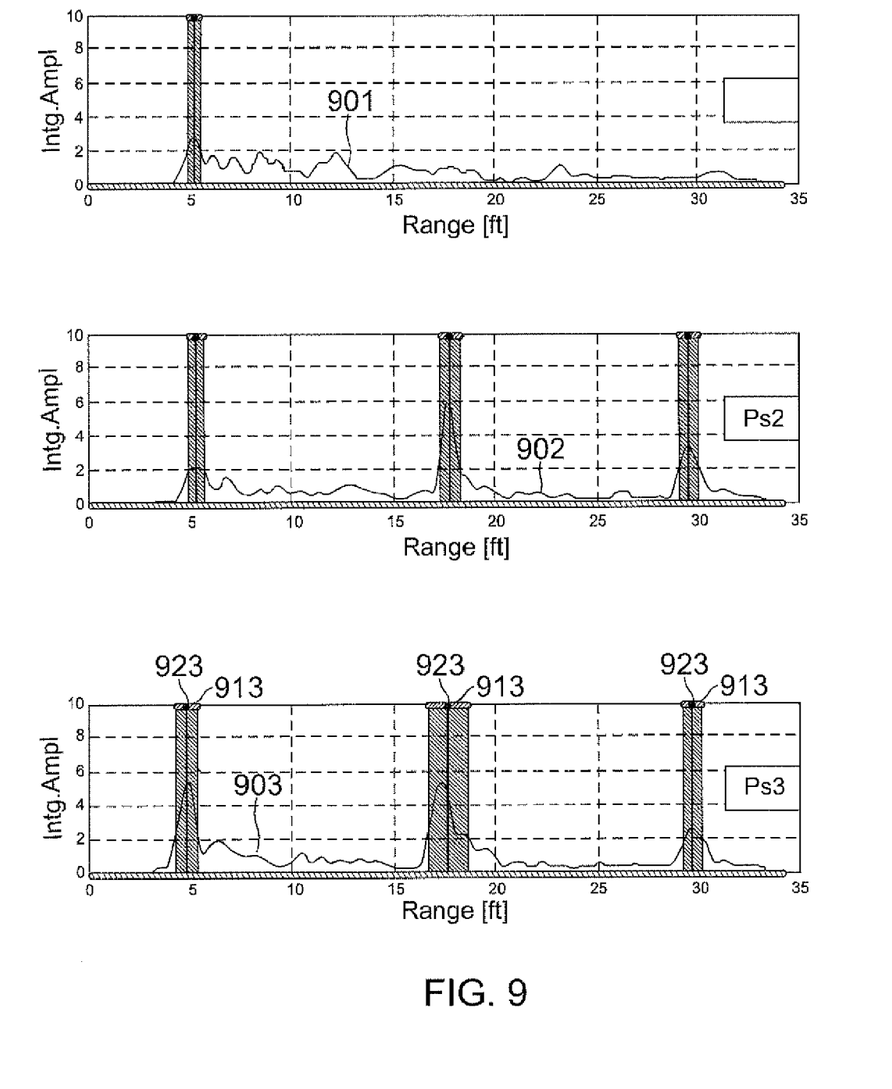
FIG. 9 is a set of signal strength graphs after integration corresponding to responses shown in FIG. 5 in accordance with an embodiment.

FIG. 9 is a set of signal strength graphs after integration corresponding to responses shown in FIG. 5. Similar signal processing steps to those described with reference to FIG. 7 can be carried out to generate the wall image from the data recorded on the "perpendicular to hallway" axis (Y-axis). The integrated waveforms, after summing the multiple (e.g., 30 for the present example) waveforms shown in FIG. 5 at each scan location Ps1, Ps2, and Ps3, followed by a 100-tap moving average filter, are shown in FIG. 9 (plots 901, 902, 903). A fixed threshold value of $T_0=2.0$ is used for this example, and the results of the detector output are shown as shaded clusters 913 of markers for each scan location. An adaptive CFAR detector can also applied for this example. The mean of each "shaded cluster" 913 is demarcated by a center marker 923 indicating the estimated wall location along "perpendicular to the hallway" axis (Y-axis). Note that in the "Ps1" data, the response at the true location of the back-wall of the restroom (RR) (e.g., wall 62) is obscured by multiple echoes due to metallic toilet aisles located closer to radar unit 102 in the boresight direction. The Ps2 and Ps3 integrated waveforms, however, more clearly indicate the locations of the walls 62, 64 due to absence of strong reflecting clutter in front of the middle walls.

Figure 10A:
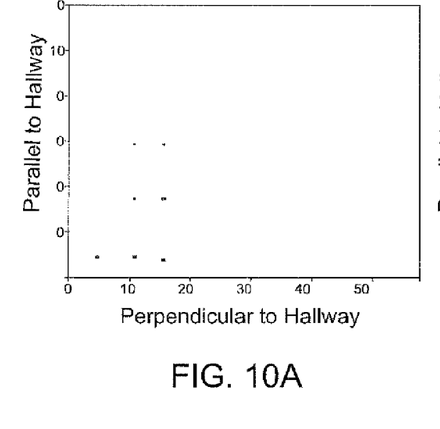
FIG. 10 is a pair of displays showing estimated and interpolated wall coordinates obtained from marker locations shown in FIG. 9 in accordance with one embodiment.
Figure 10B:
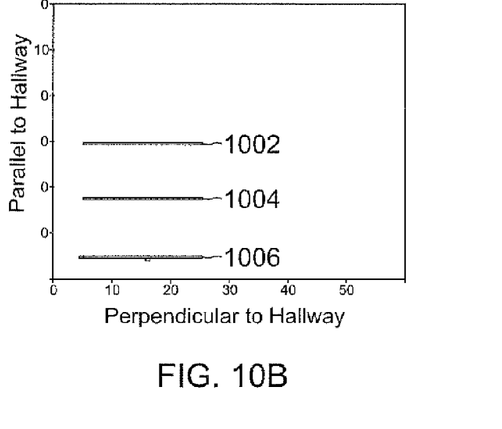

FIG. 10 is a pair of displays showing estimated and interpolated wall coordinates obtained from marker locations shown in FIG. 9. With markers 923 assigned to the estimated wall locations, a 2-dimensional "binary" image is formed with these marker coordinates, similar to the description given with reference to FIG. 8. Such an image is shown in FIG. 10A, on the same X-Y coordinate frame used for FIG. 8. With $N_p$ set to 2, three straight lines 1002, 1004, 1006 indicating the wall locations drawn at a specific pixel on the "parallel to hallway" axis (X-axis) are obtained as shown in FIG. 10B.

Figure 8B:
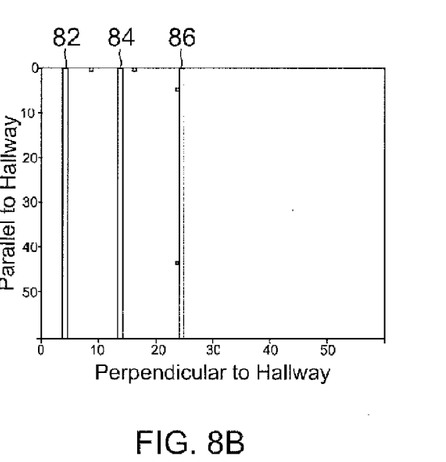
Figure 11:
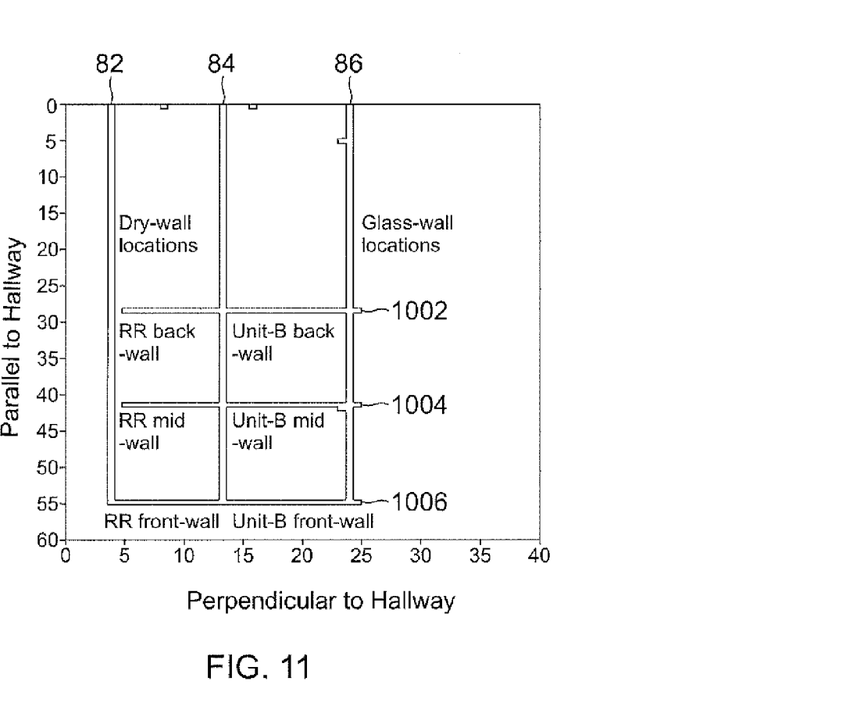
FIG. 11 is a display showing estimated wall locations based on combining the images from displays shown in FIG. 8 and FIG. 10 in accordance with one embodiment.

FIG. 11 is a display showing estimated wall locations based on combining the images from displays shown in FIG. 8 and FIG. 10. A 2-dimensional image of reconstructed walls in the building 50 may be generated by adding the images from FIG. 8B and FIG. 10B. If any pixel value after addition exceeds the value 1, its value is set to 1. That way the image contains only binary valued pixels. The resultant image is shown in FIG. 11. Except the rear wall of the restroom (denoted by "RR back-wall"), the locations of front and back walls of the office space "C", all the walls of unit "B", and front and mid-walls of the restroom ("RR") have been correctly identified. The mid-walls of "C" could not be detected since they were outside the radar unit 102 unambiguous range.

Figure 12:
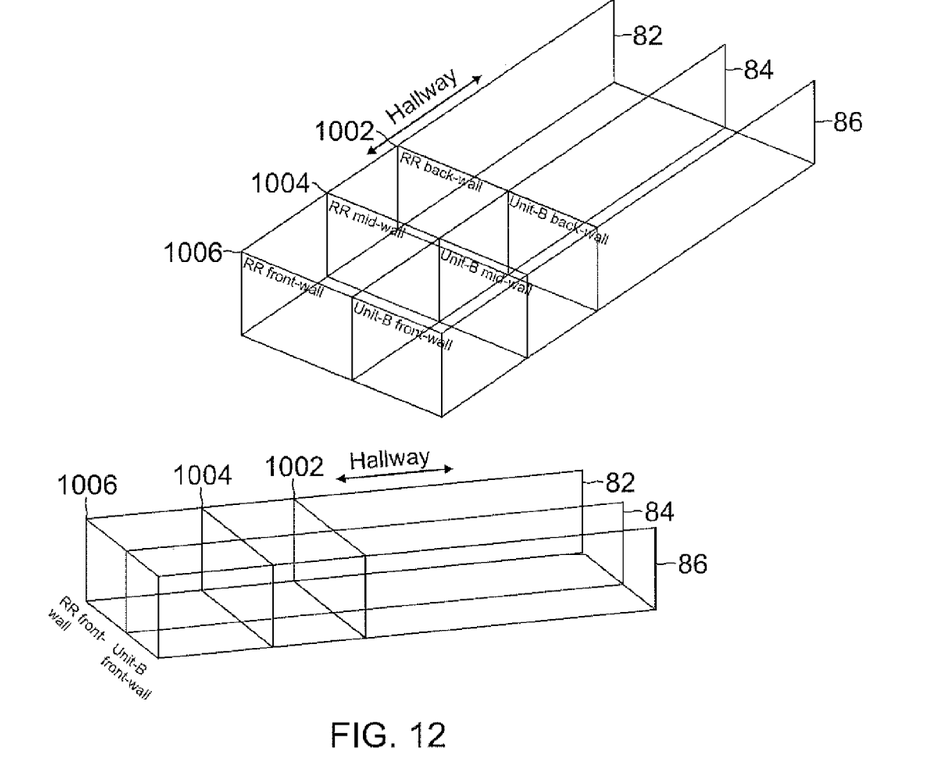
FIG. 12 is a pair of 3-dimensional modeling images of inside walls of the building shown in FIG. 3 in accordance with an embodiment.

FIG. 12 is a pair of 3-dimensional modeling images of inside walls of the building 50 shown in FIG. 3. The 2-dimensional image of estimated wall locations, as shown in FIG. 11, may be used to generate a 3-dimensional image of the building 50. By first populating all the pixels in the 3-dimensional image space with arbitrary fixed values, 2-dimensional slices (planes) are extracted at specific values of X and Y where the wall locations are estimated in FIG. 11 and Z=0. Using Matlab® functions used for rendering 3-dimensional surface images based on 2-dimensional data, the final 3-dimensional image of the wall locations of the building 50 is shown in FIG. 12 for two different view-angles. The images may be drawn to scale in 3 dimensions.

Embodiments described herein illustrate but do not limit the disclosure. It should also be understood that numerous modifications and variations are possible in accordance with the principles of the present disclosure. Accordingly, the scope of the disclosure is best defined only by the following claims.

We claim:

1. A system comprising:
   a radar unit configured to provide raw data from scanning an exterior of a structure, wherein the raw data from scanning is provided from multiple scan locations; and
   a signal processing and imaging module configured to:
   process the raw data into markers of interior locations of the structure;
   populate an image grid having a first axis and a second axis with wall-coordinate pixels estimated from the multiple scan locations;
   demarcate an interior wall of the structure from the wall-coordinate pixels by a line passing through the first axis at a fixed pixel location on the first axis and parallel to the second axis if the wall-coordinate pixels along the line satisfy a pre-determined criterion; and
   display an image of interior structural features based on the markers.

2. The system of claim 1, wherein:
   the signal processing and imaging module is further configured to form a 2-dimensional binary image from coordinates of the markers.

3. The system of claim 1, wherein the signal processing and imaging module is further configured to:
   form a 2-dimensional binary image from coordinates of the markers; and
   form an image of interior structural features based on the 2-dimensional binary image.

4. The system of claim 1, wherein:
   the pre-determined condition is satisfied if the number of wall-coordinate pixels along the line that are those of marker coordinates exceeds a specified number $N_p$.

5. The system of claim 1, wherein:
   a coordinate of the image grid is determined to be a marker coordinate based on an average waveform amplitude of the raw data that falls within a range bin exceeding a suitable threshold $T_0$.

6. A method comprising:
   scanning a building structure from the exterior of the structure using a radar unit to provide raw data;
   processing the raw data into markers of interior locations of the structure, further comprising:
   summing waveforms of the raw data from multiple locations;
   smoothing the summed waveforms using a moving average filter into an integrated waveform;
   determining clusters of markers based on a threshold detector applied to the integrated waveform;
   assigning each cluster a single marker at the center of the cluster based on a criterion that clusters of markers are separated from each other by at least a pre-chosen distance parameter $R_{cluster, min}$;
   estimating locations of interior structural features of the structure from the markers; and
   displaying an image of the interior structural features.

7. The method of claim 6, wherein:
   the threshold detector comprises comparing the amplitude of the integrated waveform to a suitable threshold $T_0$.

8. The method of claim 6, wherein:
   the threshold detector comprises an adaptive threshold detector, based on a constant false alarm rate (CFAR) estimation for a given false alarm rate.

* * * * *